United States Patent [19]

Krutz et al.

[11] Patent Number: 4,593,555
[45] Date of Patent: Jun. 10, 1986

[54] SPEED AND TORQUE SENSOR FOR HYDRAULIC MOTOR

[75] Inventors: Gary W. Krutz, 605 Northridge Pl., West Lafayette, Ind. 47906; Mark Evans, College Station, Tex.

[73] Assignee: Gary W. Krutz, West Lafayette, Ind.

[21] Appl. No.: 562,436

[22] Filed: Dec. 16, 1983

[51] Int. Cl.⁴ .............................................. G01L 3/26
[52] U.S. Cl. ........................................ 73/116; 73/502
[58] Field of Search .................................. 73/116, 502

[56] References Cited

U.S. PATENT DOCUMENTS 3,667,290  6/1972  Hohn ..................................... 73/116

FOREIGN PATENT DOCUMENTS

821979  4/1981  U.S.S.R. .............................. 73/116

Primary Examiner—Peter Chin
Attorney, Agent, or Firm—Barnes & Thornburg

[57] ABSTRACT

A system for measurement of the speed and torque produced by hydraulic motors. A strain gauge-based, integral hydraulic motor speed and torque sensor is accurate in measuring the motor speed at system pressures greater than 1.4 megapascals (MPa) (203 lb./in²). The sensor can also accurately determine the torque being produced by the motor from the fluid pressure.

10 Claims, 20 Drawing Figures

SPEED AND TORQUE SENSOR FOR HYDRAULIC MOTOR

This invention relates to hydraulic circuits and particularly to a sensor for incorporation into a hydraulic motor for measuring motor speed and torque.

Fluid power use on mobile equipment and industrial machinery has been rapidly increasing in recent years. Fluid power systems offer many advantages over mechanical systems, including long component life, high power density, and design flexibility through the ability to place the actuators in positions remote from the power source.

The hydraulic motor, in particular, has found many new uses in machine tools, material handling systems, and farm implements. In many applications, the control of the system demands some measure of the torgue required to drive the machine or the speed at which a shaft is being driven. Speed and torque sensing have been proven useful in hydrostatic transmissions. For example, torque limiting controllers are commonly manufactured as integral components in hydrostatic transmissions to be used on mobile equipment.

Dramatic advances in electronics, which have reduced the cost and increased the power of computing, have made it possible to control automatically many hydraulic systems which previously relied on manual control. In many situations, the only factor preventing the development of electronic control systems has been the lack of accurate, low-cost sensors (McEwen, E. 1975. The State-of the-Art of Transducers. *Convergence 74, International Colloquium of Automotive Electronic Technology,* SAE Publication P-57, Warrendale, Pa., pp. 129–135). Previous experience in automotive engine control has demonstrated that the technology can be rapidly marketed as soon as low-cost transducers are developed.

Accordingly it is an object of the present invention to provide an accurate, low-cost speed and torque sensor for a hydraulic motor. Such a device would make it feasible to control or monitor many systems which are not currently controlled or monitored. In addition, new applications for hydraulic motors will become attractive when such a sensor is available. For example, the increasing popularity of hydraulically driven rear wheel assist drives on combines raises the possibility of using an integral speed sensor for controlling the relationship between the speed of the front and rear wheels. Another application for such a speed and torque sensor is in the control of material handling systems. In many conveying systems, the material mass flowrate is proportional to the torque required to drive the conveyor. Similarly, the volume flowrate may be proportional to the speed of the conveyor. The ability to control and monitor conveying systems automatically promises to increase the operating efficiencies of many industrial and agricultural applications.

The application of sensors to machines and processes in every field is growing rapidly. The automotive industry has been leading the way in sensor development, in part because of the demand for higher fuel economy. Therefore, much of the sensor literature deals with automotive applications.

There are a tremendous number of techniques for measuring angular velocity (speed), but only a few of them are commonly used. Optical encoders, which are used primarily for precision positioning, can also be used to measure speed. If a gear is available or a tone wheel can be easily attached to an output shaft, a variable reluctance tachometer is a commonly used device. When both the direction of rotation and the speed are required, then the D.C. tachometer-generator is commonly used.

The variable reluctance sensor has been used extensively in automotive applications. Very accurate measurements of engine speed can be made with variable reluctance sensors combined with multitoothed tone wheels attached to the engine crankshaft (Fleming, William J. 1981. An Engine Sensor Update. *Automotive Engineering,* Vol. 90, No. 8, pp. 52–59, August 1982). Other applications (Hood, Robert B. 1974. Sensors, Displays and Signal Conditioning. *Automotive Electronics,* SAE Paper No. 740015, Warrendale, Pa., pp. 107–193) include distributor sensing for ignition control, antiskid braking systems, and speedometer cable sensing for "cruise control." John Deere uses speed sensors for both the front and rear wheels of their grader in order to maintain a constant relationship between the speed of the rear wheels and the speed of the hydraulically driven auxiliary front-wheel drive.

Until recently, almost all torque measurements were performed using strain gage torque transducers. Although this type of sensor is still the mainstay for most uses, several new concepts have been developed for automotive applications in order to reduce the size and increase the reliability in harsh environments.

Pratt, G. W. 1976. An Opto Electronic Torquemeter for Engine Control. *Sensors for Electronic Systems,* SAE Publication No. SP-404, Warrendale, Pa., pp. 47–50, reported on two types of opto-electronic torque sensors which were designed to fit the output shafts of automotive transmissions. Both types produced a signal which was related to the angular deformation of the shaft The slotted disk torque sensor measured the pulse width of a light beam that passed through two separated slotted disks. As the shaft twisted under torque the slots would no longer line up exactly and the pulse width would change.

The fiber optic type of torque sensor works on the same principle as the slotted disk type. Two separated bands of alternately reflecting and non-reflecting strips were applied to the shaft. Light from an optic fiber is reflected off the first strip and then is directed to a second strip via fiber optics where it is reflected again. The output is a series of rectangular pulses whose width is proportional to the shaft torque. With suitable instrumentation, the shaft speed can also be obtained from the pulses.

Fleming, William J. and Paul W. Wood. 1982. Non-Contact Sensor Measures Engine Torque. *Automotive Engineering,* Vol. 90, No. 1, pp. 58–62, January 1982, described a magnetic torque sensor being developed by General Motors. This sensor detects the change in the magnetic permeability of a crankshaft which is induced by the change in the stress due to torque. The prototype, which was 22 mm (0.866 in.) wide, displayed excellent accuracy and high frequency response.

Fleming supra discussed four variations of the magnetic sensor and their applications. The four branch design senses torque at the end of an engine crankshaft and has possible application for engine control systems. The cross sensor used in an overdrive gearshift control senses torque at the output shaft of the overdrive unit. A three-ring sensor measures torque at the output shaft of a transmission and is used in a transmission gear-shift control system. A multiple four-branch design is used to measure the output torque of aircraft turbines.

The major drawback of the magnetic sensor is the need to calibrate the sensor for each shaft because the torque measurement depends on the shaft properties. It is possible that this problem may be solved by depositing a coating or applying a sleeve to the shaft.

In fluid power applications, it is common to determine the torque output of a hydraulic motor by measuring the system pressure, since the torque output is directly proportional to the pressure. Patterson, Donald E. 1980. High-Torque Hydraulic Motors Challenge Electrics. *Machine Design* (Special Supplement), Jan. 15, 1980, pp. 22–23, gives a simple example in which the torque outputs of low-speed high-torque hydraulic motors are controlled by setting a relief valve pressure.

In hydrostatic transmissions, pump input torque is limited by an integral servo-mechanism which senses the system pressure and changes the pump displacement so that the product of pressure and displacement is limited. (Reinke, D. B. 1979, Open Circuit Controls for Hydrostatic Drives. *Hydraulics and Pneumatics*, Vol. 32, No. 8, pp. 60–63, August 1979). Cornell, Charles R. 1980. Electronic Control of Hydraulic Drives. *Machine Design* (Special Supplement), Jan. 15, 1980. pp. 18–19, describes an electronic torque limiting system which measures the pump displacement, and then controls a proportional valve to limit the maximum pressure as a function of the displacement.

Suggs, C. W. and C. F. Abrams, Jr. 1972. Automatic Hydraulic Height Control Mechanism for Rotary Cutting Harvesting Equipment. *TRANSACTIONS of the ASAE*, Vol. 15, No. 3, pp. 428–432, in developing an automatic height control mechanism for the rotary cutter on a sugar cane harvester, successfully used the supply pressure to a hydraulic motor as an indicator of the cutting torque being produced by the motor. Schueller, John K., et al. 1982. Combine Feedrate Sensors. ASAE Paper No. 82-1577, presented at the ASAE Winter Meeting, Chicago, Ill., Dec. 14–17, 1982, used the pressure across a hydraulic motor driving the feeder of a combine in order to measure the torque required to drive the conveyor. This signal was then used as an indicator of the mass flowrate through the combine.

Most pressure sensing devices are based on the deflection of either a bellows or a diaphragm by the fluid under pressure. The bellows-type devices are low pressure instruments which usually measure deflection with either a potentiometer or a linear differential transformer (LVDT). The diaphragm-type devices can use strain gages, capacitance, reluctance, and piezoresistive changes to measure diaphragm deflection.

Sacchetti, Peter J. 1981. A low Cost Ratiometric Pressure Sensor. *Advances in Instrumentation*, Proceedings of the ISA Conference and Exhibit, Vol. 36, Part 1, 1981. Instrument Society of America, Research Triangle Park, N.C., describes a low-cost pressure transducer for the automotive and home appliance industries which used a short stroke metal bellows and a high-resolution, conductive plastic potentiometer. Hagen, D. F. 1978. Electronic Engine Controls at Ford Motor Company. *Convergence 78, International Conference on Automotive Electronics*, Society of Automotive Engineers, Warrendale, Pa., discussed a capacitive diaphragm, absolute pressure transducer which was used to measure engine manifold pressure, a function of engine load.

Teschler, Leland. 1982. Advances in Sensor Technology. *Machine Design*, Vol. 54, No. 12, pp. 65–69, May 20, 1982, reported on another engine manifold pressure sensor which was made by diffusing strain gage resistors into a silicon diaphragm. These sensors could be made inexpensively because they use the same technology as is used in integrated circuit manufacture. Their accuracy is limited by temperature sensitivity. Recently, though, manufacturers have developed methods to compensate for temperature. In one of these methods, a temperature sensor is diffused into the same chip containing the pressure sensor. By using an integral microcomputer to calculate the correction for temperature shifts, a performance of bettern than 0.1% full scale has been achieved over a 100° C. range (Wolber, W. G. 1981. Sensors in the 1980's Part I: Where We Are Today. *Hydraulics and Pneumatics*, Vol. 34, No. 5, pp. 72–75, May 1981 and Wolber, W. G. 1981. Sensors in the 1980's Part II: Other Engineering Considerations. *Hydraulics and Pneumatics*, Vol. 34, No. 6, pp. 77–80, June 1981).

A novel type of transducer developed by United Technologies is based on the phenomenon of surface acoustic waves (SAW). According to Reeder, T. N. et al. 1976. Frequency Output Pressure Sensors Based on an Applicaton of Surface Acoustic Wave Technology. *Sensors for Electronic Systems*, SAE Publication No. SP-404, Warrendale, Pa., pp. 51–59, this frequency-based pressure transducer uses the phenomenon that surface acoustic waves travel at a velocity which is proportional to the strain in the substrate material.

Fleming supra described two sensors which have been developed to detect cylinder pressures in engines. One type is a washer shaped piezeoelectric ring which is torqued down under the spark plug. A second type uses a strain gauge head bolt which measures the strains in the bolt due to cylinder pressures. The disadvantage of this sensor is that each bolt must be individually calibrated.

Hood supra listed many possible applications for pressure sensors in automobiles. These included manifold pressure sensing with barometric pressure compensation, oil pressure monitoring, flow metering via pressure drops, and monitoring of turbocharger output, brake pressure, tire pressure and air bag pressure. Other possible uses include hydraulic suspension control and electronic shift control based on transmission fluid pressure.

In mobile hydraulic applications, transducers need to be rugged, accurate, and inexpensive (Beercheck, Richard C. 1981. Brawn with Brains: Controlling Hydraulics with Electronics. *Machine Design*, Vol. 53, No. 2, pp. 57–60, Jan. 22, 1981). Most current sensors are relatively accurate, but fragile and expensive. These problems have been addressed somewhat by recent efforts in the automotive industry. However, many automotive sensors operate in ranges too low for hydraulic applications.

Accordingly, it is an object of this invention to provide an integral sensor for a hydraulic motor which will measure the speed and torque being produced by that motor.

The motor chosen for reduction of the invention to practice was the White Hydraulics Roller Stator hydraulic motor. Experiments directed toward reducing the invention to practice had as their objectives: To evaluate various sensing methods in order to determine the one best suited for application to a hydraulic motor;

To determine a suitable location for the placement of the sensor; To test the speed sensing accuracy of the prototype over the full range of motor speeds; and, To test the torque sensing accuracy of the prototype.

The invention may best be understood with reference to the following description and accompanying drawings which illustrate the invention. In the drawings.

Figure 1:
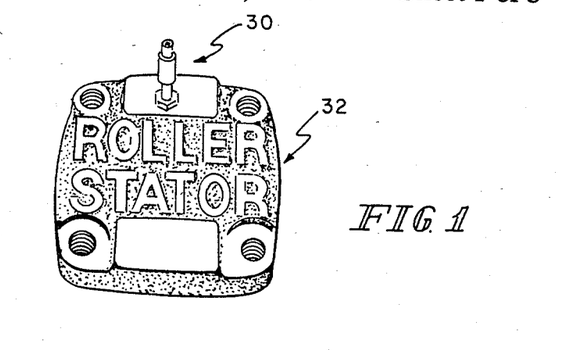
FIG. 1 is a perspective view of a prototype pressure transducer mounted in the endcover of a hydraulic motor to test the thesis of the present invention.

The White Roller Stator hydraulic motor is constructed in such a way that a pressure sensor can be easily mounted next to the rotor set. The White Roller Stator hydraulic motor is a class of hydraulic motors known as gerotor motors. These motors include rotors whose teeth or lobes are constantly in contact with a stationary outer gear or roller set. The White motor includes seven cylindrical rollers and a six-lobed rotor. The White motor is somewhat different from other gerotor motors in that the oil is supplied to and from the rotor through the same side of the motor. The valving is performed by the motor's shaft. A pressure sensor located next to one of the chambers would receive six pressure pulses for each revolution of the shaft. In a preliminary test, a Precision Measurements model 147 miniature pressure sensor 30 was mounted in the end cover 32 of a motor 34 as shown in FIG. 1. It was demonstrated that the torque produced by the motor 34 was proportional to the pressure, and that the pressure pulses produced a signal of a form suitable for speed sensing.

Figure 2:
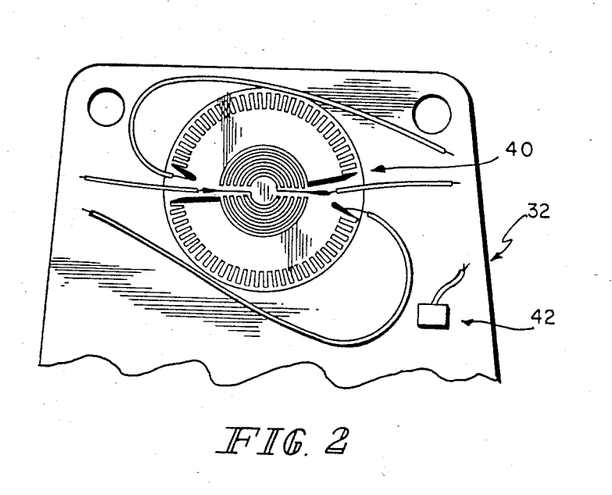
FIG. 2 is an elevational view of a full bridge diaphragm transducer strain gage.
Figure 3:
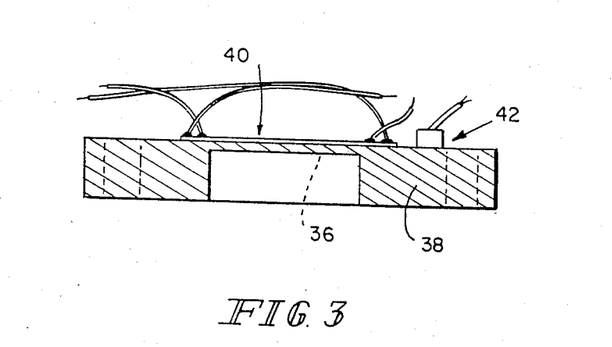
FIG. 3 is a sectional side elevational view of a transducer plate for mounting on an end of a hydraulic motor housing.

A pressure sensor was then constructed as illustrated in FIG. 3. A 12.70 mm (0.5 in.) diameter by 1.52 mm (0.06 in.) thick diaphragm 36 was machined into a 6.35 mm (0.25 in.) thick ground steel plate 38. Using Eastman 910 adhesive, a 11.18 mm (0.44 in.) diameter full bridge diaphragm strain gage 40 (BLH #FAES4-44-12S6, 120Ω) was bonded to the plate 38 over the diaphram 36. The strain gage 40, shown enlarged in FIG. 2, is designed to take advantage of the strains present in a uniformly loaded diaphragm with rigidly fixed edges.

Design equations for diaphragm pressure transducers are given in a technical bulletin published in Micro-Measurements. 1968. Design Considerations for Diaphragm Pressure Transducers. M-M Technical Note TN-129. Romulus, Mich., August 1968. At the center of the diaphragm, the radial and tangential strains are identical, and are given by:

$$\epsilon_r = \epsilon_t = \frac{3P R^2 (1 - \nu^2)}{8 t^2 E} \tag{1}$$

where:
P = pressure, MPa
R = diaphragm radius, mm
t = diaphragm thickness, mm
ν = Poisson's ratio
ε = modulus of elasticity, MPa As the distance from the center of the diaphragm increases, the radial strain decreases rapidly, becoming negative and equal to twice the center strain at the edge. The tangential strain becomes zero at the edge. Therefore, $$\epsilon_r = \frac{-3P R^2 (1 - \nu^2)}{4 t^2 E} \tag{2}$$

$$\epsilon_t = 0$$

The stresses can be determined from the general biaxial stress-strain relations.

$$\sigma_r = \frac{E}{1 - \nu^2} (\epsilon_r + \nu \epsilon_t) \tag{3}$$

$$\sigma_t = \frac{E}{1 - \nu^2} (\epsilon_t + \nu \epsilon_r) \tag{4}$$

Using the values P = 6.90 MPa, R = 6.35 mm, t = 1.52 mm, ν = 0.3 and E = 207,000 MPa, the strains and corresponding stresses are given below.

|  | Strain | Stress |
| --- | --- | --- |
| At the center | $\epsilon_r = 199 \frac{\mu m}{m}$ | $\sigma_r = 58.8$ MPa |
|  | $\epsilon_t = 199 \frac{\mu m}{m}$ | $\sigma_t = 58.8$ MPa |
| At the edge | $\epsilon_r = -397 \frac{\mu m}{m}$ | $\sigma_r = -90.3$ MPa |
|  | $\epsilon_t = 0$ | $\epsilon_t = -27.1$ MPa |

The yield stresses, $\sigma_y$, of 1020 steel is 248 MPa. Therefore, the factor of safety, $FS = \sigma_y/\sigma_r$, is 2.75 at a pressure of 60.9 MPa, the maximum used for testing. At the motor's rated pressure of 10.3 MPa the factor of safety drops to 1.8. This safety factor is suitable for experimental work, but the effect of fatigue would have to be accounted for in a commercial transducer.

The undamped resonant frequency of a rigidly clamped diaphragm is given by $$f_n = \frac{1.62t}{R^2} \sqrt{\frac{E}{12\rho(1 - \nu^2)}} \text{ Hz} \tag{5}$$

where:

$\rho$ = density of diaphragm material, kg/m$^3$

Using $\rho = 7800$ kg/m$^3$, $E = 207 \times 10^9$ Pa, $t = 1.52 \times 10^{-3}$m, and $R = 6.35 \times 10^{-3}$m, $f_n = 95,200$ Hz.

The transducer 40 of the type illustrated in FIG. 2 was mounted using Eastman 910 adhesive on the plate 38 in such a way that the diaphragm 36 was located over one of the chambers in the roller stator unit. A copper-constantan thermocouple 42 was soldered to the plate 38 for determining temperature effects.

Test Stand

Figure 4:
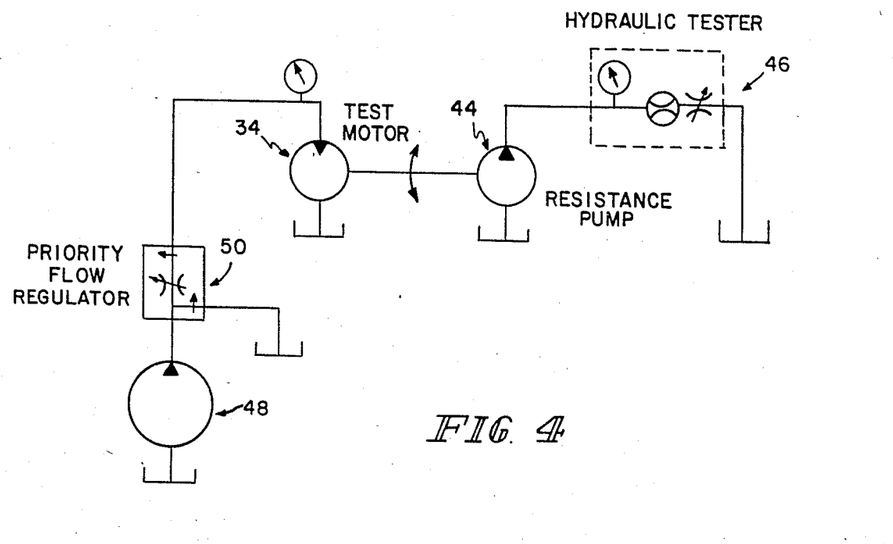
FIG. 4 is a schematic diagram of the hydraulic circuit of the test stand with which the present invention was tested.

The sensor of FIG. 3 was mounted in a White Hydraulics Model RS-GE-1 Roller Stator motor 34 (FIG. 4), having a displacement of 164 cm$^3$/rev, for testing. The test system used a driven motor 44 to provide the resistance. The resistance could be varied by restricting the flow through an inline hydraulic tester 46. A 6.7 kW hydraulic power supply 48 capable of producing a flow of 45 l/min was used to power the test motor 34. A priority flow regulator 50 enabled the flow to be continuously varied from 0 to 45 l/min.

Figure 5:
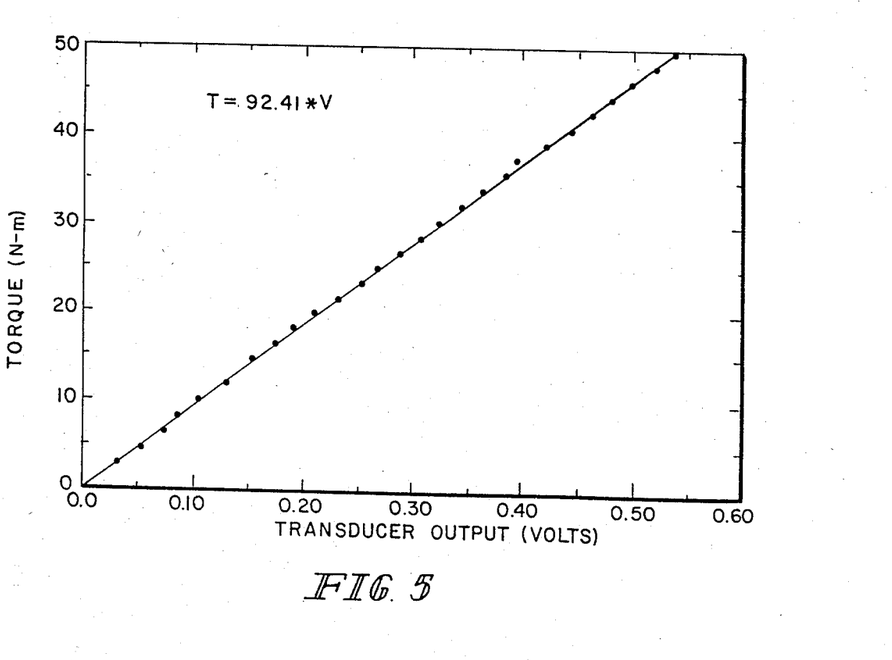
FIG. 5 is a torque transducer calibration curve.

The actual torque being produced by the motor 34 was measured with a Lebow Model 1228 torque transducer having a range of ±1130 N-m. A Daytronic 3170 strain gage conditioner/amplifier was used with the torque transducer. It was set at a 10 volt excitation and the amplified signal was coupled through the DC-2 kHz analog output. A calibration plot for the transducer/amplifier combination appears in FIG. 5.

The speed of the motor 34 was sensed with a zero velocity variable reluctance sensor in conjunction with a 60 tooth ring mounted on the torque transducer. The voltage pulses from the sensor 36, 38, 40 were coupled to a Flotech Model 1400 programmable multicounter on which the motor 34 speed was calculated and displayed to the nearest rpm. When testing the prototype transducer 36, 38, 40 as a speed sensor, a Hewlett-Packard 5308A timer/counter was used to display the motor 34 speed to the nearest rpm.

A Biomation Model 805 waveform recorder was used in conjunction with a Tektronix T935A 35 MHz oscilloscope to record and display high frequency signals from the sensor 36, 38, 40. The waveform recorder digitized and stored the input sgnals with an 8-bit analog-to-digital converter giving a resolution of 0.78% of the input sensitivity setting. The signals were then stored in a data acquisition system, such as the Digital Equipment Corporation PDP 11/70 computer.

Figure 6:
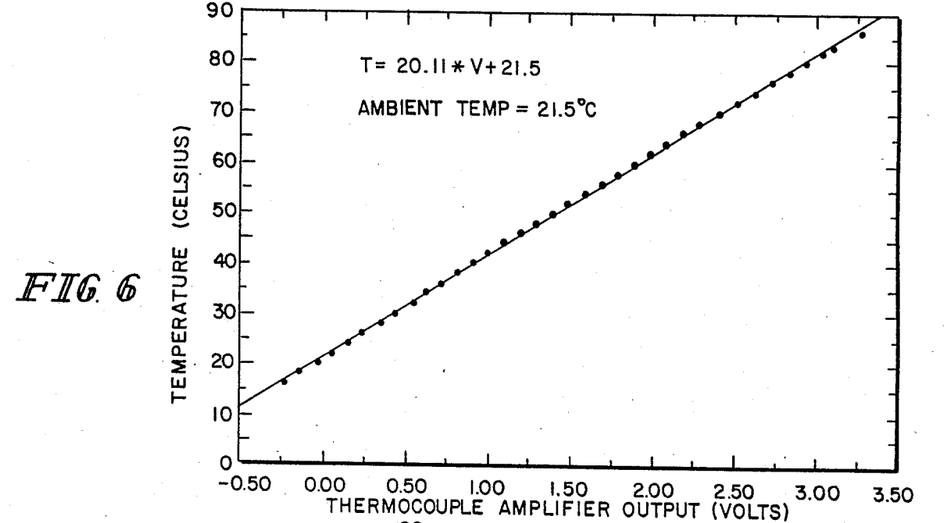
FIG. 6 is a thermocouple calibration curve.

The temperature at the sensor was measured with the copper-constantan thermocouple 42 which was connected to a Midwestern Instruments TA-200M thermocouple amplifier. The output voltage was referenced to 0 volts at test room ambient temperature. A plot of the calibration of the thermocouple/amplifier combination appears in FIG. 6.

The analog outputs from the strain gage and thermocouple amplifiers and the waveform recorder were multiplexed to a 12-bit analog-to-digital converter having a resolution of 0.0048 volts. The anlog-to-digital converter was interfaced with the PDP 11/70 computer, which was used for storing and analyzing the data.

TEST PROCEDURES

Pressure Sensor Location Tests

The following procedure was used to record the pressure signals at various locations.

Figure 7:
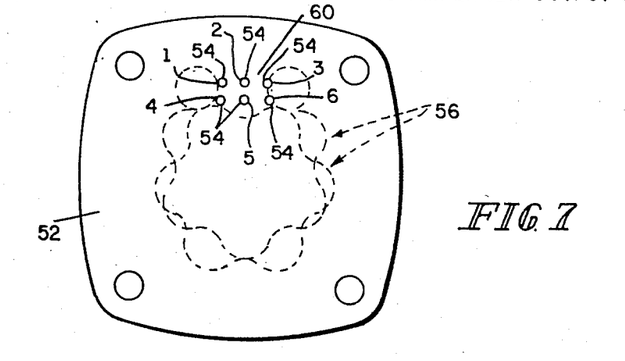
FIG. 7 is an elevational view of a port plate used in testing the transducer of the present invention, illustrating locations 1–6 where pressure pulses were measured by the transducer.

Two plates 52 with 1.59 mm or 0.79 mm diameter holes 54, respectively, drilled in locations 1-6 (FIG. 7) were positioned in two different sets of tests over the motor 34 rotor set 56, illustrated in broken lines in two positions in FIG. 7. The end cover 38 containing the pressure transducer 36, 40 in each set of tests was fastened over the plate 52. The motor 34 was started and the torque was increased to give an output of 1.3 volts. The speed was set at 72 rpm. The pressure signal was recorded at 500 points/second by the waveform recorder using an input sensitivity setting of 2 volts full scale. The stored digital signal was output in analog form at a rate of 10 points/second to the data acquisition system where the BASIC program BIO.BAS was used to record and store the data in a computer data file. The location, torque, speed, and hole size of the plate 52 were recorded. All six locations 1-6 illustrated in FIG. 7 were tested for each of hole diameters 1.59 mm and 0.79 mm.

Speed Sensing Tests

The speed obtained from pressure pulses was compared with that obtained from the magnetic-based speed sensor in order to test the sensor as a speed sensing device. The following test procedure was used. The motor 34 was started and torque was increased until the desired pressure was obtained. The actual speed measured by the magnetic sensor was displayed to the nearest rpm. The display was updated once every second. The frequency of the pressure signal was displayed by the timer/counter to the nearest 0.1 Hz and was updated once every 10 seconds. Since the motor 34 produces six pulses per revolution, the rpm was obtained by multiplying the frequency by 10. The two speed readings were recorded and the process was repeated for other speeds selected essentially randomly.

Torque Sensing

Data was taken to develop a relationship between the average pressure at the sensor 36, 40, the sensor 36, 40 temperature, as recorded from the thermocouple 42, and the speed of the motor 34 using the following procedure. The motor 34 was started and the BASIC program TORQUE.BAS was used to collect 100 points from each of the sensors 36, 40 and 42, calculate the means and store them in a computer data file. The 100 points collected from the sensor 36, 40 included both points at peaks and points in the troughs in the pressure waveform. Therefore, the calculated mean was based upon the average amplitude pressure of the periodic pressure pulse signal. The torque was changed and the above steps repeated until a complete load and unload torque curve had been obtained.

RESULTS

Location Tests

Figure 8:
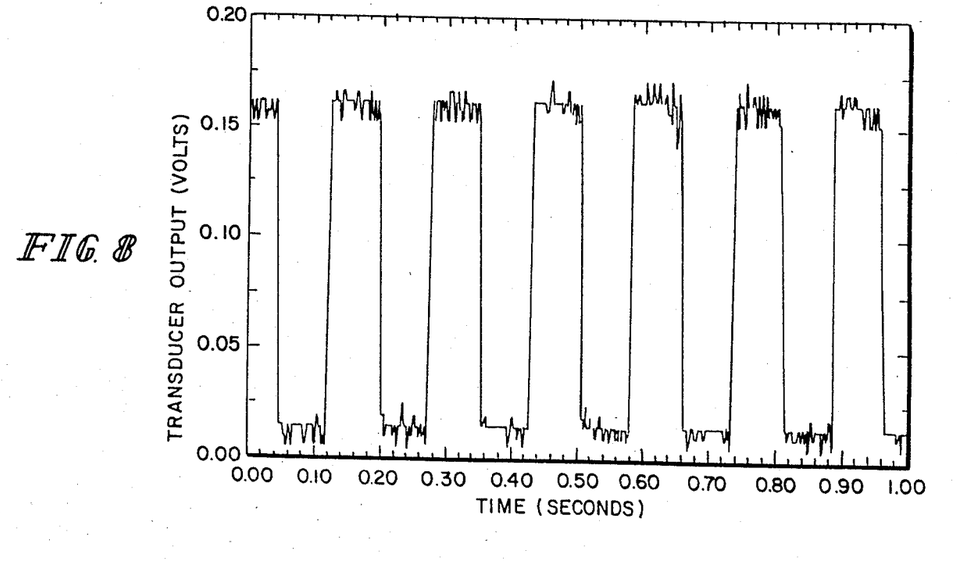
FIG. 8 is a graph of pressure pulses at location 2 of FIG. 7.
Figure 9:
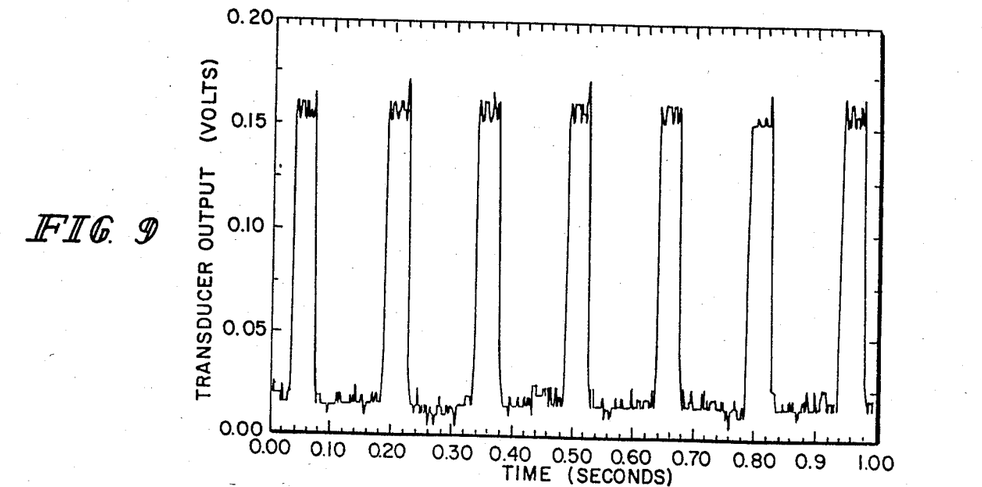
FIG. 9 is a graph of pressure pulses at location 5 of FIG. 7.

The pressure pulses recorded at location 2 (FIG. 7) are shown in FIG. 8. Since the pressure sensor 36, 40 is always exposed to the fluid in the chamber 60, the pulses of FIG. 8 are generally square waves with equal lengths at both the system and exhaust pressures. FIG. 9 shows the pressure pulses at location 5, where the sensor 36, 40 is not exposed during part of the cycle. This causes the high pressure pulse to be shorter in duration. The pressure pulses at the remaining locations were very similar to those of location 2 (FIG. 7). The pressure pulses were the same for the plate 52 with 1.59 mm diameter holes 54 and the plate 52 with 0.79 mm diameter holes 54.

Speed Sensing

Figure 10:
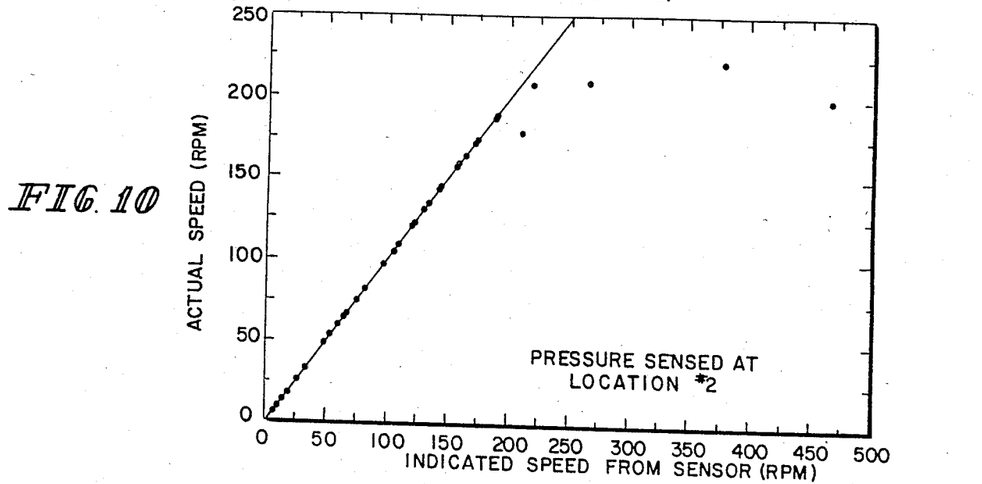
FIG. 10 is a graph of the results of a speed sensing test at 200 psi at location 2 of FIG. 7.

Preliminary testing demonstrated that the strain gage 40 signal from the pressure pulses could be used to measure the motor 34 speed, as long as the amplitude of the pressure pulses was greater than 1.38 MPa (200 lb/in.$^2$) FIG. 10 shows the results of a speed sensing test where the system pressure was maintained at 1.38 MPa. With the port plate 52 positioned over location 2, the sensor 36, 40 was able to measure the speed accurately up to about 175 rpm.

Figure 11:
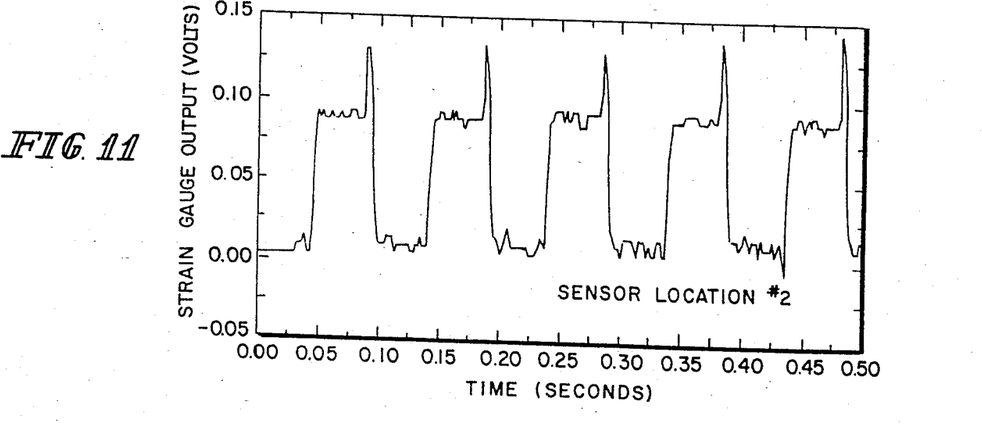
FIG. 11 is a graph of pressure pulses at 100 rpm and 200 psi at location 2 of FIG. 7.
Figure 12:
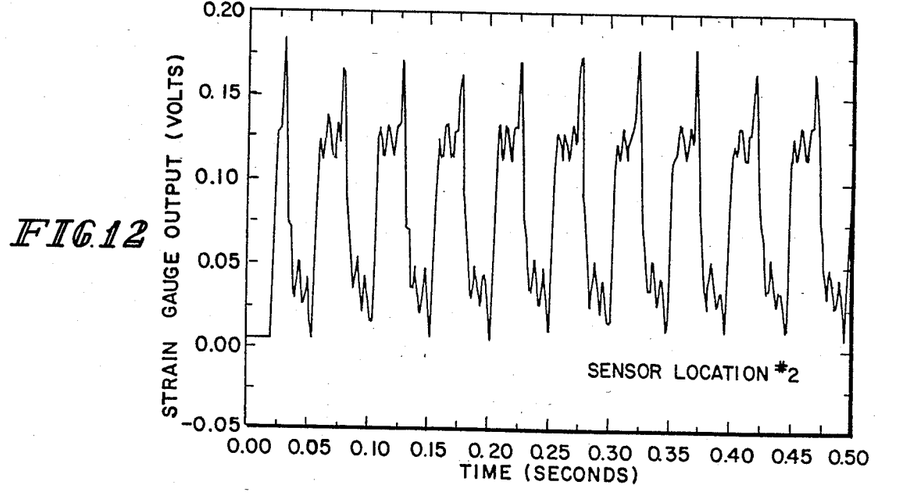
FIG. 12 is a graph of pressure pulses at 150 rpm and 200 psi at location 2 of FIG. 7.

The errors at high motor 34 speeds were caused by changes in the waveform of the pressure pulses. As shown in FIG. 11, the pulses at 100 rpm are relatively "square" in form. FIG. 12 shows the pulses at 200 rpm. The extra spikes in the signal of FIG. 12 occasionally triggered the frequency counter, resulting in errors in measurement.

Figure 13:
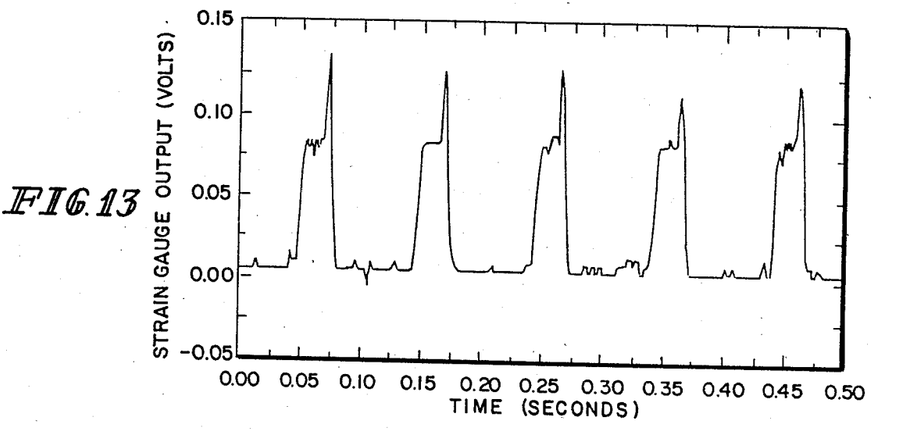
FIG. 13 is a graph of pressure pulses at 100 rpm and 200 psi at location 5 of FIG. 7.
Figure 14:
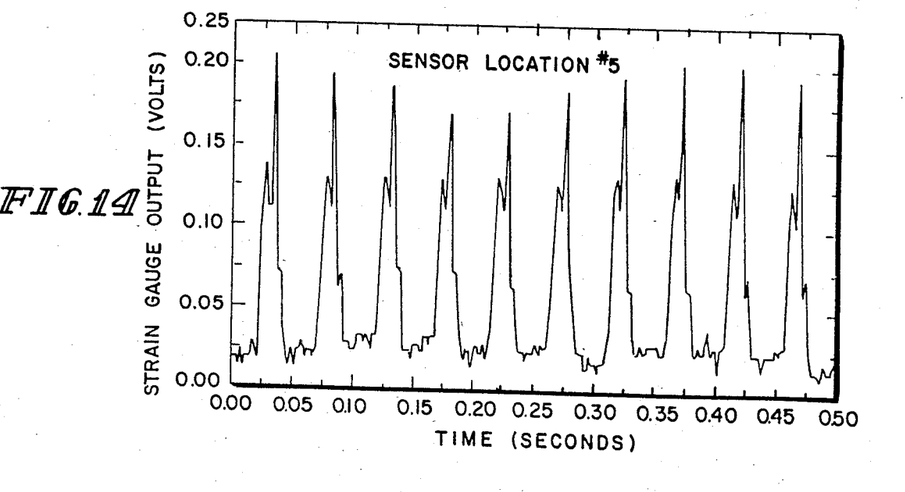
FIG. 14 is a graph of pressure pulses at 150 rpm and 200 psi at location 5 of FIG. 7.
Figure 15:
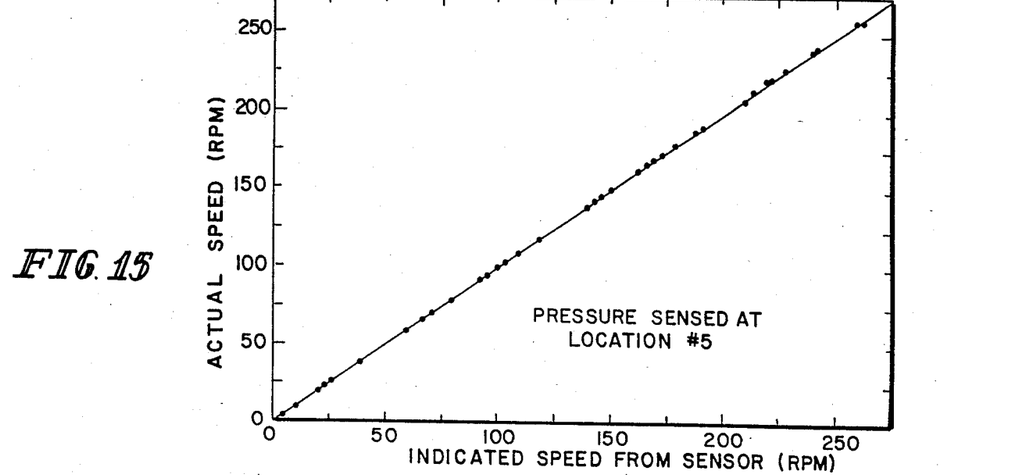
FIG. 15 is a graph of the results of a speed sensing test at 200 psi at location 5 of FIG. 7.

In an effort to solve this problem, the pressure was sensed at location 5 of port plate 52. The pressure pulses at 100 rpm and 200 rpm are shown in FIGS. 13 and 14, respectively. The waveform is less "spikey" because the sensor 36, 40, when measuring the pressure at location 5, is not exposed to the fluid during part of the cycle. The speed sensing results at this location are shown in FIG. 15. The maximum deviation from the actual speed is 2 rpm.

Figure 16:
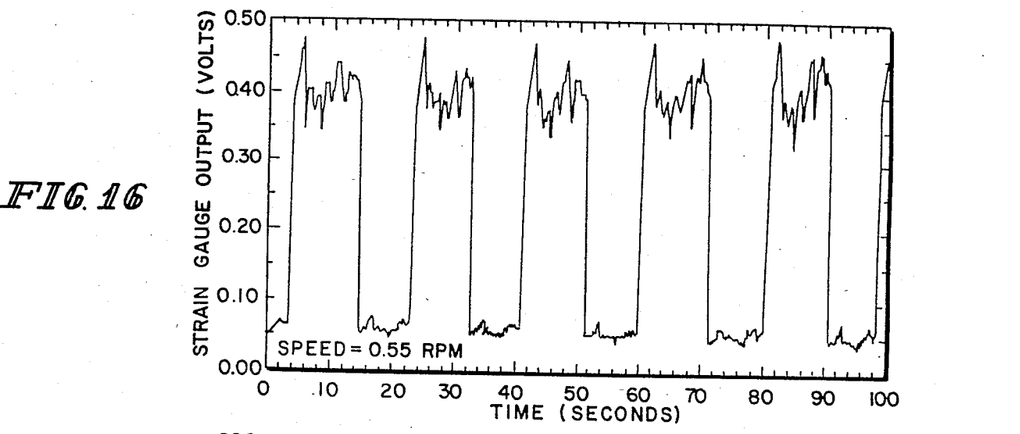
FIG. 16 is a graph of pressure pulses at very low speed (0.55 rpm)
Figure 17:
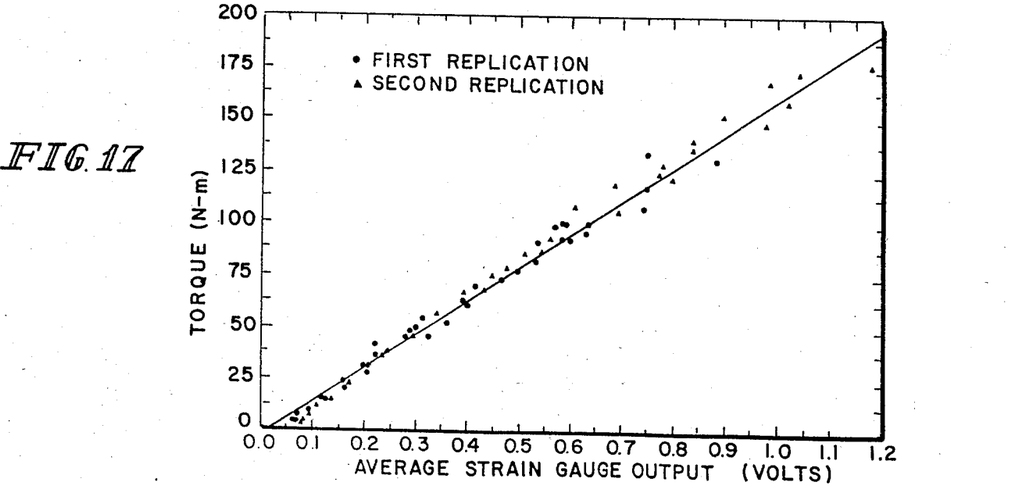
FIG. 17 is a graph of the results of torque sensing tests at 10 rpm.
Figure 18:
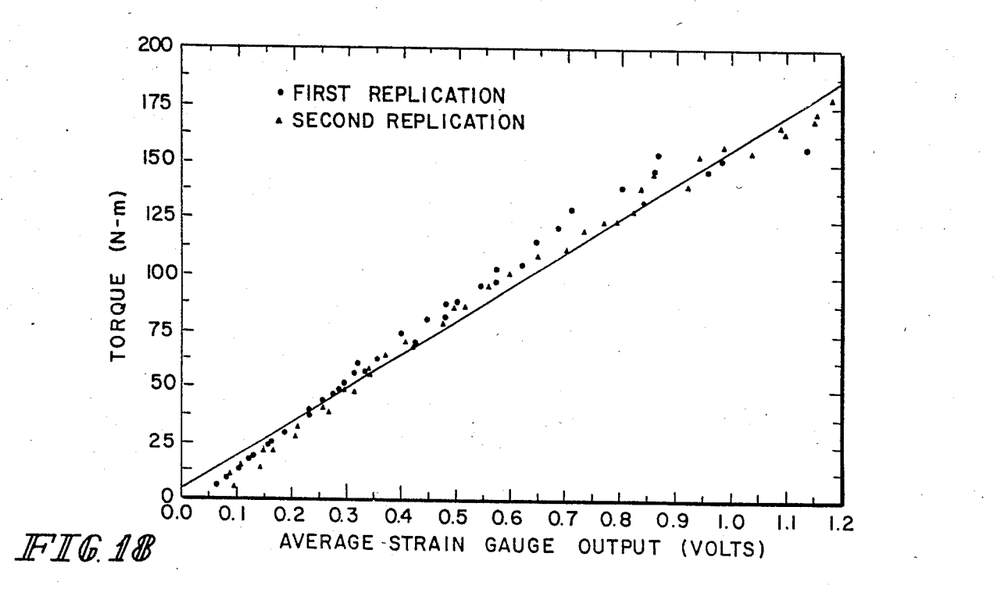
FIG. 18 is a graph of the results of torque sensing tests at 50 rpm.
Figure 19:
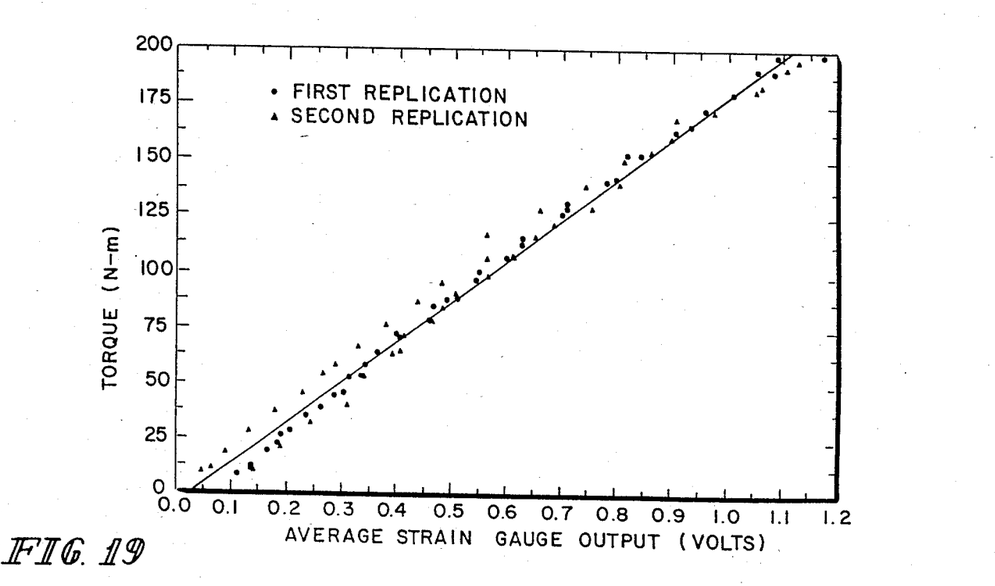
FIG. 19 is a graph of the results of torque sensing tests at 100 rpm.
Figure 20:
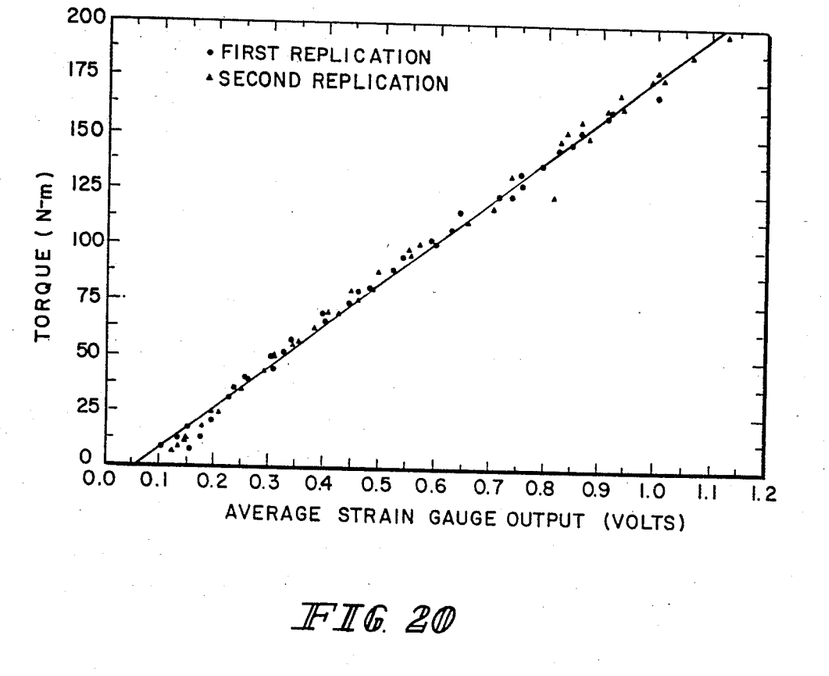
FIG. 20 is a graph of the results of torque sensing tests at 150 rpm.

The pressure pulses at a speed of 0.55 rpm and a pressure of 2.07 MPa (300 lb/in.$^2$) are shown in FIG. 16. The pulses maintain their generally square wave form indicating that the sensor 36, 40 is useful at very low motor 34 speeds.

Torque Sensing

The results of the tests of the transducer 36, 40 as a torque sensor for motor 34 speeds of 10, 50, 100, and 150 rpm are shown in FIGS. 17, 18, 19, and 20, respectively. The two replications at each speed are shown in different symbols. The regression line through the points is based upon a single factor regression of torque with the strain gage 40 output.

Regression analysis was performed on the data for each motor 34 speed using the three different regression models given below.

$$T = b_0 + b_1 p \quad (6)$$

$$T = b_0 + b_1 p + b_2 t \quad (7)$$

$$T = b_0 + b_1 p + b_2 t + b_3 t^2 \quad (8)$$

where:

T = torque, N—m
p = pressure signal, volts
t = sensor plate temperature, °C.

The regression coefficients resulting from the analysis along with the corresponding $R^2$ values are given in Table 1.

TABLE 1

| Speed (rpm) | Regression Coefficients from Analysis of Torque Test Date. | | | | |
|---|---|---|---|---|---|
| | $b_0$ | $b_1$ | $b_2$ | $b_3$ | $R^2$ |
| 10 | −2.0 | 162.1 | | | 0.983 |
| | 4.1 | 160.9 | −0.2 | | 0.983 |
| | 6.5 | 161.1 | −0.4 | 0.003 | 0.983 |
| 50 | 3.8 | 153.0 | | | 0.980 |
| | 12.5 | 153.2 | −0.2 | | 0.981 |
| | −86.9 | 151.0 | 3.9 | −0.039 | 0.982 |
| 100 | −4.8 | 184.1 | | | 0.988 |
| | −20.3 | 184.4 | 0.4 | | 0.992 |
| | 15.2 | 185.3 | −1.6 | 0.027 | 0.992 |
| 150 | −11.6 | 189.1 | | | 0.994 |
| | −17.2 | 189.3 | 0.1 | | 0.995 |
| | −18.2 | 189.4 | 0.2 | −0.0005 | 0.995 |

Based on the small improvement in $R^2$ values when temperature is added to the model it can be concluded that the temperature effect is small. In the case of motor speeds of 10 and 50 rpm the 95% confidence interval for the term $b_2$ included zero.

The maximum errors in the torque sensing accuracy, when the single factor regression with the strain gage 40 output is used, are given in Table 2.

TABLE 2

| Torque Sensing Accuracy of the Sensor 36, 40. | |
|---|---|
| Motor 34 Speed (rpm) | Maximum Error (% full scale) |
| 10 | 7.8% |
| 50 | 10.1% |
| 100 | 8.6% |
| 150 | 8.6% |

At the conclusion of several of the tests, it was observed that after the sensor 36, 40 had cooled to near ambient temperature, the strain gage 40 signal had an offset between −0.09 and −0.03 volts. It is possible that, at elevated temperatures, some creep was occuring in the adhesive between the gage 40 backing and the plate 38. This may also explain the spread in one of the data sets at 100 rpm.

Changing the speed of the motor 34 had the effect of changing the regression coefficient, $b_1$, for pressure. The relationship between the motor speed and $b_1$ is not a simple function because of the many factors which change with speed. It has been shown, for example, that the pressure signal's shape changes as a function of motor 34 speed. Other factors which change are the exhaust pressure, lubrication effects, and mechanical efficiency.

The zero offset of the data points along the horizontal axis reflects the pressure required to overcome friction in the motor 34. This zero offset increased slightly with increasing motor 34 speeds.

It will be appreciated that a diaphragm-type, strain gage-based sensor 36, 40 can be mounted within the motor 34. Such a sensor 36, 40 is described. The speed of the motor 34 can be accurately determined from the pressure pulses occuring within the motor 34. The average strain signal caused by the pressure pulses is an accurate indicator of the torque being developed by the motor 34. Changes in sensor 36, 40 temperature did not seriously affect the sensor 36, 40 accuracy. Changing the motor 34 speed had the effect of changing the slope of a graph of torque vs. average strain output. At low pressures, the correct triggering level for speed sensing is dependent on the speed of the motor 34.

TORQUE.BAS

```
10 rem Program for Measuring Pressure, Torque, and Temperature.
20 rem Mark Evans June 1982
30 input "what multiplexer is being used to measure pressure" m1
40 input "what multiplexer is being used to measure torque" m2
50 input "what multiplexer is being used to measure temperature" m3
60 input "Which clock is being used" c1
70 input "What filename should this date be stored under" f$
80 input "Ready to run a test. Enter return when ready to go." a$
90 assign mpx m1, mpx m2, mpx m3, clk c1
100 open f$ for output as file 1
110 input "input speed in rpm." q
120 s1 = 0
130 s2 = 0
140 s3 = 0
150 for i = 1 to 100
160 wait (c1, 0, 1, 100)
170 p1 = adc (m1, 1, 0, t)
180 s1 = s1 + p1
190 p2 = adc (m2, 1, 0, t)
200 s2 = s2 + p2
210 p3 = adc (m3, 1, 0, t)
220 s3 = s3 + p3
230 next i
240 a1 = s1/100
250 a2 = s2/100
260 a3 = s3/100
270 print #0,using "-.##### ,-.##### ,-.##### ,-###.#", a1,a2,a3,q
280 print #1,using "-.##### ,-.##### ,-.##### ,-####.#", a1,a2,a3,q
290 input "Enter a zero to stop or a one to continue" e
300 if e > 0 then go to 110
310 deassign
320 close
330 stop
340 end
```

BIO.BAS

```
10 rem Program to transfer biomation data to unix file
20 rem Program collects 10 pts/sec from biomation
30 rem Program set for biomation record rate of 500 pts/sec
40 input "What multiplexer is connected to the biomation" m1
50 input "What clock should be used" c1
60 input "What file name should this data be given" f$
70 assign mpx m1, clk c1
80 open f$ for output as file 1
90 r = 1000
100 for i = 1 to 500
110 wait (c1, 1, 1, r)
120 p = adc (m1, 1, 0, t)
130 t = (i−1)/500
```

-continued

BIO.BAS

```
140 print #1, using "-##.###,-.#####", t, p
150 next i
160 wait (c1, 0, 1, 0)
170 deassign
180 close
190 stop
200 end
```

What is claimed is:

1. An apparatus for determining an operating parameter of a fluid motor comprising a motor housing having a deflectable housing wall region, the deflectable housing wall region deflecting in response to stress applied to the deflectable housing wall region from within the motor as the motor operates, and means for detecting the resulting strain on the deflectable housing wall region, and for producing a signal indicative of the occurrence and amount of the strain.

2. The apparatus of claim 1 wherein the motor comprises a hydraulic motor.

3. The apparatus of claim 2 wherein the hydraulic motor comprises a motor rotor and a roller stator defining between them a plurality of chambers, and a housing end plate positioned at an end of the motor housing and adjacent the chambers defined between the motor rotor and the roller stator.

4. The apparatus of claim 3 wherein the deflectable region comprises a thin wall region in the end plate, the thin wall region being in open communication with one of the chambers.

5. The apparatus of claim 4 wherein the detecting means comprises a strain gauge coupled to the outside of the housing end plate and responsive to the strain produced on the thin wall region by hydraulic fluid in the chamber in open communication with the thin wall region.

6. The apparatus of claim 1 wherein the operating parameter is hydraulic fluid pressure.

7. The apparatus of claim 1 wherein the operating parameter is motor speed.

8. The apparatus of claim 5 wherein the operating parameter is motor speed and the thin wall region is in open communication with a portion of the chamber which is exposed to hydraulic pressure only during a portion of each hydraulic pressure pulse occurring in the chamber.

9. The apparatus of claim 1 wherein the operating parameter is motor torque.

10. The apparatus of claim 5 wherein the operating parameter is motor torque end the thin wall region is in open communication with a portion of the chamber which is exposed to hydraulic pressure only during a portion of each hydraulic pressure pulse occurring in the chamber.

* * * * *